United States Patent
Chang et al.

(10) Patent No.: US 10,399,893 B2
(45) Date of Patent: Sep. 3, 2019

(54) PHOTO-ELASTIC COMPENSATION OF THIN GLASS SHEETS

(71) Applicants: Rohm and Haas Company, Philadelphia, PA (US); Rohm and Haas Electronic Materials LLC, Marlborough, MA (US); Dow Global Technologies LLC, Midland, MI (US)

(72) Inventors: Shih-Wei Chang, Natick, MA (US); Lanfang Li, Somerset, NJ (US); Kathleen M. O'Connell, Cumberland, RI (US); Weijun Zhou, Sugar Land, TX (US)

(73) Assignees: Rohm and Haas Electronic Materials LLC, Marlborough, MA (US); Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 119 days.

(21) Appl. No.: 15/533,717

(22) PCT Filed: Dec. 8, 2015

(86) PCT No.: PCT/US2015/064363
§ 371 (c)(1),
(2) Date: Jun. 7, 2017

(87) PCT Pub. No.: WO2016/099985
PCT Pub. Date: Jun. 23, 2016

(65) Prior Publication Data
US 2017/0362120 A1 Dec. 21, 2017

Related U.S. Application Data

(60) Provisional application No. 62/093,570, filed on Dec. 18, 2014.

(51) Int. Cl.
C03C 17/32 (2006.01)
C03C 17/00 (2006.01)
C03C 17/28 (2006.01)
G02B 5/30 (2006.01)
G02F 1/1333 (2006.01)

(52) U.S. Cl.
CPC .......... C03C 17/324 (2013.01); C03C 17/002 (2013.01); C03C 17/28 (2013.01); C03C 17/32 (2013.01); C03C 17/328 (2013.01); G02B 5/3083 (2013.01); C03C 2218/365 (2013.01); G02F 1/1333 (2013.01); G02F 2001/133302 (2013.01); Y10T 428/10 (2015.01); Y10T 428/1086 (2015.01); Y10T 428/1095 (2015.01)

(58) Field of Classification Search
CPC ..... C03C 17/001; C03C 17/002; C03C 17/28; C03C 17/328; C03C 17/32; C03C 2218/365; G02F 1/1333; G02F 2001/133302; G02F 2202/40; Y10T 428/10; Y10T 428/1086; Y10T 428/1095; G02B 5/3083
USPC ............. 428/1.1, 1.62; 349/96, 158; 438/30; 257/98
See application file for complete search history.

(56) References Cited

U.S. PATENT DOCUMENTS

| | | |
|---|---|---|
| 7,310,127 B2 | 12/2007 | Sato et al. |
| 8,659,728 B2 | 2/2014 | Kimura |
| 2002/0060762 A1 | 5/2002 | Arakawa |
| 2004/0201805 A1* | 10/2004 | Nishikouji ........... G02B 5/3083 349/117 |
| 2005/0128394 A1 | 6/2005 | Lee et al. |
| 2006/0270084 A1 | 11/2006 | Kimura |
| 2013/0133809 A1 | 5/2013 | Kondo |

FOREIGN PATENT DOCUMENTS

JP 2013161074 A 8/2013

* cited by examiner

*Primary Examiner* — Ruiyun Zhang
(74) *Attorney, Agent, or Firm* — S. Matthew Cairns

(57) ABSTRACT

A coated glass substrate. The coated glass substrate comprises a glass sheet having a thickness from 0.1 to 0.7 mm and coated on a first side with a first optical layer having a positive photo-elastic constant and coated on a second side with a second optical layer having a negative photo-elastic constant.

6 Claims, No Drawings

PHOTO-ELASTIC COMPENSATION OF THIN GLASS SHEETS

FIELD OF THE INVENTION

The present invention relates to a glass sheet exhibiting reduced light leakage when the glass is used as a substrate for flat panel display and experiences internal or external stresses.

BACKGROUND OF THE INVENTION

Glass is optically isotropic, but when stress is applied, this symmetry is broken and glass usually becomes birefringent. Several unusual glass compositions are known for which the birefringence is zero even in the presence of anisotropic stress; these include high contents of lead, thallium, or bismuth oxide. Such glasses are known as zero-stress optic materials and are key components in products such as optical research instruments and rear projection televisions. However, safety concerns and environmental issues prevent the use of those zero-stress optical glasses in many optical applications such as lenses, optical films, compact disks and liquid crystal display devices. In these applications, glass, e.g., portions of a liquid crystal display, can experience stresses due to mounting structures that are attached to the display or due to internal display structures. Stress induced birefringence in those glass substrates can cause issues for properly displaying image. U.S. Pat. No. 8,659,728 discloses an LC cell in which both top and bottom glass substrates of the LC cell are coated with a layer having a negative photo-elastic constant to negate stress induced retardation in the LC glass. However, this reference does not teach treatment of individual glass sheets to reduce retardation.

SUMMARY OF THE INVENTION

The present invention provides a coated glass substrate. The coated glass substrate comprises a glass sheet having a thickness from 0.1 to 0.7 mm and coated on a first side with a first optical layer having a positive photo-elastic constant and coated on a second side with a second optical layer having a negative photo-elastic constant.

The present invention further provides an LC cell comprising at least one coated glass substrate of the present invention.

DETAILED DESCRIPTION OF THE INVENTION

Percentages are weight percentages (wt %) and temperatures are in ° C., unless specified otherwise. Operations were performed at room temperature (20-25° C.), unless specified otherwise.

The photo-elastic effect induced birefringence is determined by the photo-elastic constant of the material (Cp) and the amount of stress applied to the material ($\sigma$). The photo-elastic constant is determined by calculating the ratio of stress-induced birefringence and the magnitude of the applied stress onto the glassy material under the condition that the applied stress only induces a small degree of elastic deformation in the material. Photo-elastic birefringence of a material is different from intrinsic birefringence ($\Delta n_0$) of that material Intrinsic birefringence refers to the amount of birefringence a material exhibits when it is fully oriented in one direction, for example, by uniaxially stretching the material in one direction. Materials of positive intrinsic birefringence have a refractive index in the x-direction ($n_x$), along which the material is fully oriented, larger than the refractive indices $n_y$ and $n_z$ in the other two directions, y and z, respectively, where x, y, z represent three distinct directions that are mutually orthogonal to each other. Conversely, materials of negative intrinsic birefringence have a refractive index in the x-direction, along which the material is fully oriented, smaller than the refractive indices in the other two directions, y and z. Materials of positive intrinsic birefringence type always tend to be of the positive photo-elastic type, whereas for materials of negative birefringence type, they may be either of negative photo-elasticity type or positive photo-elasticity type.

The photo-elastic constant is an intrinsic property of each material and may have a positive or negative value. Thus, materials are divided into two groups: a group having a positive photo-elastic constant and the other group having a negative photo-elastic constant. Materials with a positive photo-elastic constant tend to exhibit positive birefringence (i.e., $n_x > n_y$) when the material in subject to a small degree of uni-axial tensile stress along the x-direction. Conversely, materials with a negative photo-elastic constant will exhibit negative birefringence (i.e., $n_x < n_y$) when the material is subject to a small degree of uni-axial tensile stress along the x-direction.

We have discovered that, with a pair of optical layers having positive and negative photo-elastic constants, respectively, stress induced birefringence may be most effectively minimized in a coated glass substrate. When the coated substrate is used in an LC cell, it provides an improvement of display image performance. There are two different stress modes a coated glass substrate may experience. When an optical layer is coated onto the top of a glass substrate and the coated substrate is undergoing a bending deformation into a convex shape (with the coated layer on the outside), the coated layer will experience tensile deformation while the glass layer will experience compressive deformation. Conversely, when an optical layer is coated onto the bottom of the glass substrate and the coated substrate is bent into the same convex shape (which will have the coated layer on the inside) the coated layer will experience compressive deformation while the glass substrate will experience tensile deformation.

Retardation is a measure of birefringence in a sheet of material. It is defined as the product of $\Delta n$ and the thickness of the sheet, where $\Delta n$ is the difference between $n_x$ and $n_y$. Since glass has a positive photo-elastic constant, the overall retardation of the coated substrate (sum of the retardations for the substrate and the coating) may increase if the optical layer coated onto a glass substrate is under tension has a negative photo-elastic constant. On the other hand, if such layer under tension has a positive photo-elastic constant, the overall retardation of the coated substrate may decrease. Similarly, if the optical layer coated onto a glass substrate under compression has a negative photo-elastic constant, the overall retardation of the coated substrate may decrease whereas the overall retardation of the coated substrate may increase if such layer under compression has a positive photo-elastic constant. In all these cases, the glass tends to experience a deformation mode opposite to that of the coating layer.

In a preferred embodiment of the present invention, an LC cell contains two glass substrates, and each glass substrate is coated with optical layers having a positive photo-elastic constant and a negative photo-elastic constant, respectively.

In a preferred embodiment of the present invention, the absolute values of the positive photo-elastic constant and the negative photo-elastic constant are similar or substantially identical to each other. Preferably, the difference between the absolute values is no greater than $250 \times 10^{-12}$ Pa$^{-1}$, preferably no greater than $150 \times 10^{-12}$ Pa$^{-1}$, preferably no greater than $100 \times 10^{-12}$ Pa$^{-1}$. Preferably the positive photo-elastic constant is equal to or greater than $5 \times 10^{-12}$ Pa$^{-1}$, preferably $10 \times 10^{-12}$ Pa$^{-1}$, preferably $25 \times 10^{-12}$ Pa$^{-1}$. Preferably the negative photo-elastic constant is equal to or less than $-5 \times 10^{-12}$ Pa$^{-1}$, preferably $-10 \times 10^{-12}$ Pa$^{-1}$, preferably $-25 \times 10^{-12}$ Pa$^{-1}$. If the absolute values of the photo-elastic constants are less than $5 \times 10^{-12}$ Pa$^{-1}$, it would not be very effective to compensate stress induced birefringence of the substrate unless the coating layer is very thick, which is undesirable for consumer electronic devices.

Preferably, glass substrates used for the current LCD manufacturing are alumina silicate ($Al_2O_3$—$SiO_2$), borosilicate ($B_2O_3$—$SiO_2$) or aluminborosilicate ($Al_2O_3$—$B_2O_3$—$SiO_2$) types that may be further modified with alkaline earth oxides. These glasses all exhibit positive photo-elastic response and have a photo-elastic constant of approximately $2\text{-}4 \times 10^{-12}$ Pa$^{-1}$. Application of the coating layers of the present invention on these glass substrates as well as any other types of glass substrates that have positive photo-elastic property would be effective. It is also noted that intense research efforts have been conducted on developing glass with zero photo-elastic constant. However, unless a large amount of toxic compounds such as lead, arsenic, and mercury, etc. is incorporate into the glass, no glass sheets used in LCD manufacturing exhibit near zero photo-elastic response. Preferably, glass substrates used in the present invention are substantially free of lead, thallium and bismuth, i.e., each of these metals is present in an amount less than 1,000 ppm, preferably less than 800 ppm, preferably less than 600 ppm, preferably less than 400 ppm, preferably less than 200 ppm, preferably less than 100 ppm, preferably less than 50 ppm.

Preferably, materials having a positive photo-elastic constant which can be used to form an optical layer coated onto a glass substrate are selected from the group consisting of acrylate polymers (e.g., poly(benzyl methacrylate)) other than polymethylmethacrylate and copolymers, acrylate polymers comprising halogen atoms such as fluorine and chlorine), poly(vinyl naphthalene, polycarbonate, polystyrene, styrene copolymer, styrene-acrylonitrile copolymer, styrene maleic anhydride copolymer, maleimide-styrene copolymer, polyester, cyclic olefin copolymer, cyclic olefin polymer and cellulosic polymers. Preferable materials having a large positive photo-elastic constant include polycarbonate, polyester and acrylate polymers. Preferably, acrylate polymers used to form a layer having a positive photo-elastic constant have no more than 60 wt % polymerized units of methyl methacrylate, preferably no more than 50 wt %, preferably no more than 40 wt %, preferably no more than 30 wt %, preferably no more than 20 wt %, preferably no more than 10 wt %, preferably no more than 5 wt %. Preferably, materials having a negative photo-elastic constant, which can be used to form an optical layer coated onto a glass substrate are selected from the group consisting of polymethylmethacrylate, fully hydrogenated vinyl aromatic polymers and copolymers (e.g., cyclic block copolymer comprising fully hydrogenated styrene-isoprene block copolymers), poly($\alpha$-methyl styrene), poly(tri-fluoroethyl methacrylate) and poly(tri-chloroethyl methacrylate). Preferable materials having a negative photo-elastic constant include cyclic block copolymers and polymethylmethacrylate. Preferably, cyclic block copolymer is a fully hydrogenated styrene-isoprene block copolymer with polystyrene equivalent weight average molecular weight of at least 50,000 g/mol prior to hydrogenation, preferably one having at least 60 wt % polymerized units of styrene, preferably at least 70 wt %, preferably at least 75 wt %. As commonly known by skilled artisans, polymers suitable for coating on glass substrate need to have sufficient molecular weight to have mechanical toughness and not be brittle. For typical amorphous polymers, the polystyrene equivalent weight average molecular weights need to be at least 8-10 times their entanglement molecular weight. In addition, they need to exhibit excellent optical transparency in the visible wavelength range (380-780 nm).

The preferable range of the thickness of an optical layer is less than 100 μm, more preferably less than 50 μm, even more preferably less than 25 μm. Preferably, the thickness of an optical layer is greater than 1 um, preferably greater than 5 um, preferably greater than 10 um. When the thickness of such optical coating layer is greater than 100 um, it is not desirable as consumers prefer thinner electronic devices. When the thickness of the optical layer is less than 1 um, the optical compensation effect on glass is negligible and virtually non-existing.

An optical layer according to the present invention may be coated onto a glass substrate by using any suitable coating processes well known in the art. For example, an optical layer may be coated onto glass by dip coating, spin coating, slit-spin coating or slot die coating. A slot die coating process is more preferable with its relatively easy control of coating area, coating thickness and uniformity.

The preferred range of the thickness of the glass sheet is from 0.1 mm to 0.7 mm, preferably from 0.2 mm to 0.5 mm. When the thickness of the glass substrate is greater than 0.7 mm, the effect of optical coating may not be strong enough and this will also increase the thickness of the device. When the glass substrate is less than 0.1 mm, its physical rigidity becomes problematic for device fabrication.

EXAMPLES

Three different optical polymers were used, poly(benzyl methacrylate) (PBMA), cyclic block copolymer (CBC-1), maleic anhydride modified cyclic block copolymer (CBC-2). PBMA has a positive photo-elastic constant and both CBC materials have negative photo-elastic constant. PBMA having Mw of 100 kg/mole was purchased from Scientific Polymer Products (Ontario, N.Y.). CBC-1, an optically clear material developed by The Dow Chemical Company, is a fully hydrogenated styrene-isoprene block copolymer. It has Mw of approximately 65 kg/mole and 90 wt % of styrene prior to hydrogenation. CBC-2 is also a fully hydrogenated styrene-isoprene block copolymer having 80 wt % of styrene prior to hydrogenation with approximately 1 wt % of maleic anhydride grafting. Thin glass substrate of 0.5 mm thickness manufactured by Corning Glass (Corning, N.Y.) was purchased from Coresix Precision Glass, Inc. (Williamsburg, Va.). Photo-elastic constants of optical polymers and thin glass were obtained by linear fitting the measured birefringence value ($\Delta n$) as a function of the applied stress ($\sigma$). The slope of the linearly fitted curve is the photo-elastic constant value, Cp. Stress induced birefringence measurements were made on free standing film specimens of 1"×3" size and ca. 100-300 um thickness for PBMA, CBC-1 and CBC-2 materials. Testing specimen for thin glass was cut into the size of 2"×5" (5.1×12.7 cm) using a glass scriber. Cp values of PBMA, CBC and thin glass were determined to be $33\times10^{-12}$ $Pa^{-1}$, $-12\times10^{-12}$ $Pa^{-1}$, $-8.5\times10^{-12}$ $Pa^{-1}$ and $3.3\times10^{-12}$ $Pa^{-1}$, respectively.

Reference Example 1. Bare Glass Substrate Under Bending Deformation

A glass substrate (EAGLE Glass, Corning Glass (Corning, N.Y.)) having a thickness of 0.5 mm and 2"×5" size was tested by measuring the retardation thereof. The retardation of the glass without any mechanical deformation was measured by a birefringence measurement system Exicor 150ATS made by Hinds Instrument (Hillsboro, Oreg.). A subsequent retardation measurement was made on the glass while it was bent by pressing the two long edges of glass against a bending fixture of 50 cm radius. The retardation of the glass under bending was measured and the maximum value of the retardation was found to be 3 nm. The bare glass without being subject to mechanical deformation was found to be almost completely isotropic with the measured retardation across the entire measurement area to be less than 0.1 nm. However, when the glass was deformed by a bending fixture, a substantial increase of retardation was observed. The maximum retardation occurs near the center region of the glass, a clear demonstration for stress induced birefringence effect in the glass substrate.

Example 2. Retardation Coated Glass Under Bending Deformation 40 wt % solution of poly(benzyl methacrylate) in propylene glycol monomethyl ether acetate (PGMEA) and 20 wt % solution of CBC-1 in cyclohexane were prepared for coating glass substrate. Two pieces of thin glass used in Reference Example 1 were coated with the PBMA solution and the CBC solution of poly(benzyl methacrylate) and cyclic block copolymer, respectively, and subsequently dried. The thickness of each coating was measured to be 75 μm and 92 μm, respectively.

The coated glasses were subjected to a bending deformation by pressing the uncoated side of glass against the bending fixture so that the glass was conformed to the curved shape of fixture. The coating layer experiences tensile deformation in this bending configuration. While the coated glass was under deformation, the retardation of the coated glasses was measured as described above as maximum values of 1.3 nm for the PBMA coated glass and 4.8 nm for the CBC-1 coated glass.

The retardation of the glass coated with PBMA that has a positive photo-elastic constant was substantially reduced, while the retardation of the glasses coated with cyclic block copolymer that has a negative photo-elastic constant was substantially increased, as compared with the retardation value of the bare glass measured in Reference Example 1.

Example 3. Retardation Changes of a Glass Coated With an Optical Layer Having Positive Photo-Elastic Constant Under Two Different Stress Modes A thin glass substrate identical to those used in Reference Example 1 was coated with poly(benzyl methacrylate) having a positive photo-elastic constant in the same manner as Example 2. The thickness of the coating after it was dry was measured to be about 95 um. The coated glass was deformed by pressing it against the bending fixture in two different ways. In the first case, the uncoated side of the glass substrate was in direct contact to the bending fixture, hence the coating layer were under tensile deformation while the glass substrate was predominantly under compressive deformation. In the second case, the coated side of the glass substrate was in direct contact to the bending fixture, which resulted in the compressive deformation in the coating layer. Retardation in the center region of the coated glass were measured under these two deformation modes and compared with that of bare glass. Results are summarized in the Table.

Example 4. Retardation Changes of a Glass Coated With an Optical Layer Having Negative Photo-Elastic Constant Under Two Different Stress Modes A thin glass substrate of EAGLE Glass identical to those used in Reference Example 1 was coated with a cyclic block copolymer in the same manner as Example 2. The thickness of the coating after it was dry was measured to be about 92 um. The coated glass was deformed by pressing it against the bending fixture in two different ways. In the first case, the uncoated side of the glass substrate was in direct contact to the bending fixture, hence the coating layer were under tensile deformation. In the second case, the coated side of the glass substrate was in direct contact to the bending fixture, which resulted in the compressive deformation in the coating layer. Retardation in the center region of the coated glass were measured under these two deformation modes and compared with that of bare glass. Results are also summarized in the Table.

TABLE

Retardation of Single Side Coated Glass Under Bending Deformation

| | Coating Material | Deformation Mode of The Coating Layer | Retardation (nm) |
|---|---|---|---|
| Example 1: Bare Glass | n/a | n/a | 3 |
| Example 3: 1 side Coated Glass | PBMA | tension | 0.71 |
| Example 3: 1 side Coated Glass | PBMA | compression | 4.84 |
| Example 4: 1 side Coated Glass | CBC-1 | tension | 4.78 |
| Example 4: 1 side Coated Glass | CBC-1 | compression | 1.35 |

Data in the Table shows that when a glass substrate experience different types of deformation (i.e., tension versus compression), the optics of coating layer must be properly matched in order to be effective for compensation of stress-induced birefringence in glass as discussed in Table 2 of this invention.

Example 5. Retardation of Glass With Coatings on Both Surfaces Under Bending Deformation Thin glass substrates identical to those used in Example 1 were coated with optical materials on both surfaces. 40 wt % solution of PBMA in PGMEA solvent and 20 wt % solution of CBC-2 in cyclohexane solvent were used. The target coating thickness was 100 um for both top and bottom surfaces. These coated glasses were deformed by pressing the bottom surface against the bending fixture. Subsequent retardation measurements were made while the coated glass was under bending deformation. Details of coating materials, deformation modes and measurement results are summarized in Table 4 below.

TABLE 4

Retardation of Double Side Coated Glass Under Bending Deformation

| Example 5 | Coating Material at top surface of glass | Coating Material at bottom surface of glass | Retardation Under Bending (nm) |
|---|---|---|---|
| Example 5-A | CBC-2 | CBC-2 | 5.2 |
| EXample 5-B | PBMA | CBC-2 | 2.61 |
| Example 5-C | CBC-2 | PBMA | 9.44 |

Results in Table 4 shows that coatings on both surfaces of glass may not be as effective as one side of coating because the effect from the top coating layer may counteract to that of the bottom coating layer. If the photo-elastic property of top coating layer and bottom coating layer is not suitably matched such as shown in Example 5C, the total retardation can be substantially worse than that of bare glass. Furthermore, the glass coated with negative photo-elastic materials on both top and bottom surfaces (Example 5A) was measured to have higher retardation than the glass coated with a positive photo-elastic material on top surface and a negative photo-elastic material on bottom surface as shown in Example 5B, with top and bottom coating layers undergoing tensile deformation and compressive deformation, respectively.

The invention claimed is:

1. A coated glass substrate; said coated glass substrate comprising a glass sheet having a thickness from 0.1 to 0.7 mm and coated on a first side with a first optical layer having a positive photo-elastic constant from 5 to $250 \times 10^{-12}$ $Pa^{-1}$ and coated on a second side with a second optical layer having a negative photo-elastic constant from $-5$ to $-250 \times 10^{-12}$ $Pa^{-1}$, wherein the difference between the absolute values of the photo-elastic constants is no greater than $250 \times 10^{-12}$ $Pa^{-1}$.

2. The coated glass substrate of claim 1 in which each of the first optical layer and the second optical layer has a thickness from 1 to 100 microns.

3. The coated glass substrate of claim 2, wherein the first optical layer is selected from the group consisting of poly(benzyl methacrylate), poly(vinyl naphthalene), polycarbonate, polyester, polystyrene, styrene copolymer, styrene acrylonitrile, styrene maleic anhydride, maleimide-styrene copolymer, cyclic olefin copolymer, cyclic olefin polymer and cellulosic polymers.

4. The coated glass substrate of claim 3, wherein the second optical layer is selected from the group consisting of fully hydrogenated vinyl aromatic polymers and copolymers, cyclic block copolymer, polymethylmethacrylate, poly($\alpha$-methyl styrene), poly(tri-fluoroethyl methacrylate) and poly(tri-chloroethyl methacrylate).

5. The coated glass substrate of claim 4 in which the thickness of the glass sheet is from 0.2 to 0.5 mm.

6. A liquid crystal cell comprising at least one coated glass substrate of claim 1.

* * * * *